United States Patent
Nandan et al.

(10) Patent No.: US 12,050,542 B2
(45) Date of Patent: Jul. 30, 2024

(54) METHODS AND APPARATUS TO EXTEND LOCAL BUFFER OF A HARDWARE ACCELERATOR

(71) Applicant: Texas Instruments Incorporated, Dallas, TX (US)

(72) Inventors: Niraj Nandan, Plano, TX (US); Mihir Mody, Karnataka (IN); Rajat Sagar, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/345,098

(22) Filed: Jun. 30, 2023

(65) Prior Publication Data

US 2023/0350819 A1     Nov. 2, 2023

Related U.S. Application Data

(63) Continuation of application No. 17/138,740, filed on Dec. 30, 2020, now Pat. No. 11,693,795.

(60) Provisional application No. 63/011,877, filed on Apr. 17, 2020.

(51) Int. Cl.
*G06F 13/28*     (2006.01)
*G06F 13/16*     (2006.01)

(52) U.S. Cl.
CPC .......... *G06F 13/1668* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 7,512,728 B2 | 3/2009 | Tseng | |
| 10,474,375 B2 * | 11/2019 | Fleming, Jr. | .......... G06F 9/3834 |
| 10,572,376 B2 | 2/2020 | Fleming, Jr. et al. | |
| 11,093,261 B2 | 8/2021 | Teh et al. | |
| 11,360,808 B2 | 6/2022 | Ray et al. | |

(Continued)

OTHER PUBLICATIONS

International Search Report for PCT/US2018/034156 mailed Aug. 5, 2021.

(Continued)

*Primary Examiner* — Michael Sun
(74) *Attorney, Agent, or Firm* — Brian D. Graham; Frank D. Cimino

(57) ABSTRACT

Methods and apparatus to extend local buffer of a hardware accelerator are disclosed herein. In some examples, an apparatus, including a local memory, a first hardware accelerator (HWA), a second HWA, the second HWA and the first HWA connected in a flexible data pipeline, and a spare scheduler to manage, in response to the spare scheduler inserted in the flexible data pipeline, data movement between the first HWA and the second HWA through the local memory and a memory. Local buffer extension may be performed by software to control data movement between local memory and other system memory. The other system memory may be on-chip memory and/or external memory. The HWA sub-system includes a set of spare schedulers to manage the data movement. Data aggregation may be performed in the other system memory. Additionally, the other system memory may be utilized for conversion between data line and data block.

15 Claims, 9 Drawing Sheets

(56) References Cited

U.S. PATENT DOCUMENTS

| | | |
|---|---|---|
| 2005/0071800 A1* | 3/2005 | Liu .................. H04L 12/289 |
| | | 716/104 |
| 2008/0016287 A1 | 1/2008 | Hepler |
| 2008/0114937 A1 | 5/2008 | Reid et al. |
| 2013/0222210 A1 | 8/2013 | Wang et al. |
| 2018/0081733 A1 | 3/2018 | Nandan et al. |
| 2018/0189239 A1* | 7/2018 | Nurvitadhi .......... G06F 9/30036 |
| 2019/0347125 A1 | 11/2019 | Sankaran et al. |

OTHER PUBLICATIONS

Mao, et al.; "Hardware Acceleration for Memory to Memory Copies"; Electrical Engineering and Computer Sciences University of California at Berkeley; Jan. 13, 2017; 27 pages.

\* cited by examiner

METHODS AND APPARATUS TO EXTEND LOCAL BUFFER OF A HARDWARE ACCELERATOR

RELATED APPLICATION

This application is a continuation of U.S. patent application Ser. No. 17/138,740, filed Dec. 30, 2020, which claims the benefit of and priority to U.S. Provisional Patent Application No. 63/011,877, filed on Apr. 17, 2020, each of which is incorporated by reference herein in its entirety.

FIELD OF THE DISCLOSURE

This disclosure relates generally to hardware accelerators and, more particularly, to methods and apparatus to extend local buffer of a hardware accelerator.

BACKGROUND

Computing devices include general-purpose processor cores as well as hardware accelerator (HWA) sub-systems. HWA sub-systems may provide improved performance and/or reduced power consumption. HWAs perform a sequence of tasks in one direction, which is known as a pipeline. HWA sub-systems may implement a shared memory architecture or a streaming architecture.

The shared memory architecture includes a memory that is shared between HWAs, which enables a flexible data pipeline to carry out a sequence of tasks that can vary based on a software setting. By contrast, a streaming architecture includes a dedicated memory and enables a fixed data flow pipeline to carry out a sequence of tasks that cannot vary based on a software setting.

Figure 1:
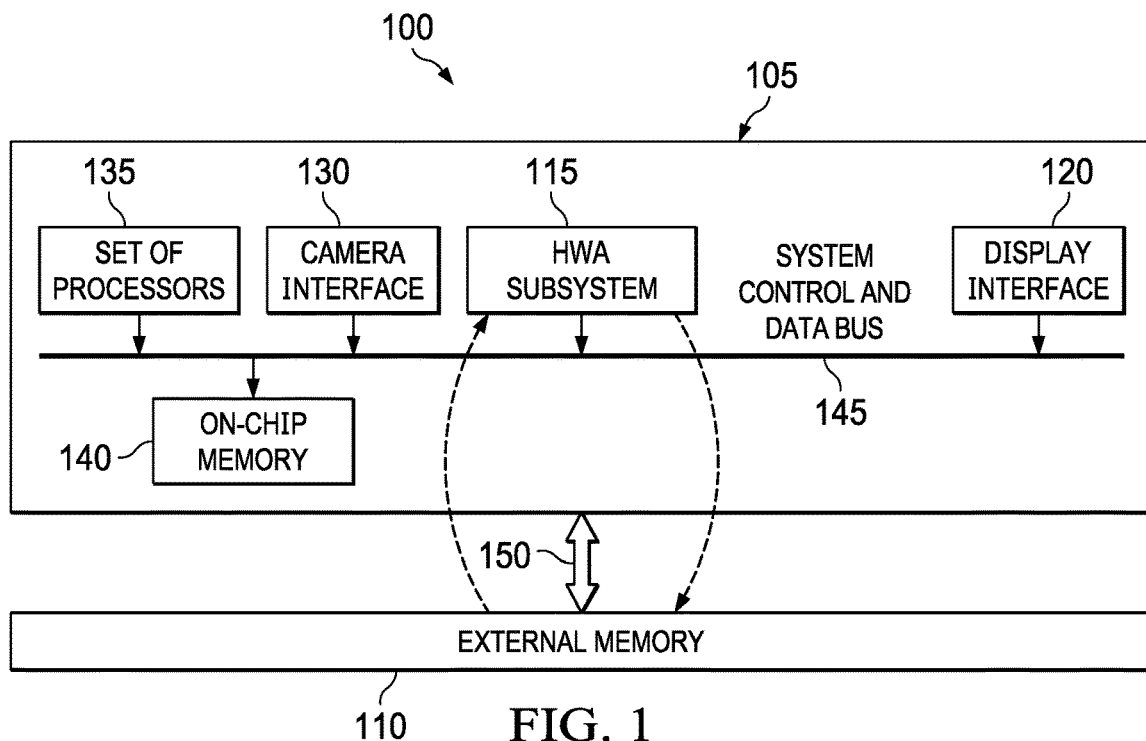
FIG. 1 is a block diagram of an example computer architecture.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A hardware accelerator (HWA) sub-system is utilized by a system on chip (SoC) for tasks such as, for example, image processing, deep learning, etc. The HWA sub-system includes a set of HWAs to perform tasks for the HWA sub-system. Each HWA from the set of HWAs may vary in tasks, input buffer requirements, output buffer requirements, etc. For example, a HWA from the set of HWAs may be a lens distortion correction (LDC) accelerator, which receives image information and performs lens distortion correction functions.

HWAs consume and/or produce data, the data being line data type (also known as "data line") or block data type (also known as "data block"). Different HWAs have different input and output requirements. For example, an input buffer requirement may be that input data is sized based on line data type (i.e., one dimensional, or 1D) (herein "line-based input") and/or data is sized based on block data type (i.e., two dimensional, or 2D) (herein "block-based input"). Output buffer requirements may be data that is sized based on lines and/or data is sized based on blocks.

The HWA sub-system includes a local memory that may include local buffers. The set of HWAs may utilize the local memory for data movement such as, for example, between a first HWA from the set of HWAs and a second HWA from the set of HWAs. Alternatively, a HWA from the set of HWAs may utilize the local memory, the HWA completely independent from HWAs not included in the set of HWAs. In examples disclosed herein, architecture of the HWA sub-system is a shared memory architecture, which enables a flexible data flow pipeline. The local memory is shared by the set of HWAs to read and/or write data to the local memory.

The flexible data pipeline indicates the sequence of the set of HWAs based on a software setting. For example, the software setting may indicate the first HWA is connected to the second HWA (i.e., the first HWA is up-stream compared to the second HWA).

The first HWA may write data to the local memory and the second HWA may read the data from the local memory. For example, the software setting may indicate the second HWA is connected to the first HWA (i.e., the second HWA is up-stream compared to the first HWA). The second HWA may write data to the local memory and the first HWA may read the data from the local memory. At least one more HWA may operate in parallel such as, for example, along with the first connection.

The HWA sub-system includes a HWA thread scheduler (HTS) to manage the task performance of the set of HWAs. For example, the HTS scheduler may send instructions to perform a set of tasks to the set of HWAs. The set of tasks may include reading data from the local memory, writing data to the local memory, etc.

A number of exemplary SoCs implement the shared memory architecture for HWA sub-systems due to the flexible data pipeline. For example, such HWA sub-systems implementing the shared memory architecture are used for Image and Video Accelerators High-Definition (IVAHD), Vision Pre-Processing Accelerators (VPAC), Depth and Motion Perception Accelerators (DMPAC), Still Image Co-Processors (SIMCOP), etc.

In some examples, when the SoC is being developed, the local memory in the HWA sub-system is designed based on an expected use case for the HWA sub-system. Each use case may have a corresponding set of design specifications to balance power, performance, size, and other factors. The portions of the design specifications that pertain to the local memory may vary based on use case.

For example, an HWA sub-system may be designed for use in a DMPAC and may include dense optical flow (DOF) accelerator functions. In such an example, the design specification may call for 140 data lines of the local internal buffer. In another example, an HWA sub-system may be designed for use in a VPAC and may include multi-scalar (MSC) functions. In such an example, the design specification may call for 5 lines of resolution.

In another example, an HWA sub-system may be designed for use in a VPAC and may include lens distortion correction (LDC) accelerator functions. However, in contrast to the previous examples, the processing needs may be variable because a size of the block-based output of the LDC accelerator is not fixed. The size of the block-based output may vary based on performance, available memory, and other factors. As a result, the design specification may account for the variable-sizing by accounting for the worst use-case scenario. The worst use-case scenario may be from the size of the block-based output that results in the largest size of the local memory. The size of the block-based output may be based on a line-based input of a HWA upstream from the LDC accelerator.

The design specification may also account for data size differences between blocks. For example, the output of a first HWA may be provided to a second HWA. The first HWA may have a block-based output having a first size and the second HWA may have a line-based input having a second size. As a result, the HWA sub-system may implement block buffer aggregation to convert blocks of data to lines of the data. Additionally, the block buffer aggregation converts the first size to the second size even if one or both sizes are variable. In that regard, the HWA sub-system supports the worst use-case scenario, which may be from the first HWA and second HWA combination that requires the largest size of the local memory. Alternatively, the first HWA may have a line-based output having a first size and the second HWA may have a block-based input having a second size. As a result, the HWA sub-system may implement line buffer aggregation to convert lines of data to blocks of the data. Additionally, the line buffer aggregation converts the first size to the second size, even in cases when the first size and/or second size are variable. In that regard, the HWA sub-system supports the worst use-case scenario, which may be from the first HWA and the second HWA combination that requires the largest size of the local memory.

To reduce the risk of over-engineering the HWA sub-system while still supporting worst-case scenarios, example approaches disclosed herein implement a HWA sub-system including a hardware thread scheduler (HTS) to allow a local memory with reduced size based on the use-cases of the HWA sub-system, while not decreasing performance of the SoC.

If the memory usage of a particular application should exceed the available local memory size, local buffer extension may be performed to control data movement between local memory and other system memory such as, for example, on-chip memory and/or external memory, which allows the other system memory to act as an extension of the local memory. The HTS may include additional elements such as, for example, a set of spare schedulers to manage this data movement, in essence "extending" the local memory. The spare schedulers may not be associated with any particular HWA, but the spare schedulers may be configured to control the operation of any of the HWAs and/or a direct memory access (DMA) controller based on the application. For example, a spare scheduler from the set of spare schedulers may be enabled for use-cases that require a memory larger than the local memory based on software settings. The spare scheduler is inserted in flexible data pipeline for the use-cases. Data aggregation may be performed in the other system memory. Additionally, the other system memory may be utilized for conversion between data line and data block.

Alternative options may transfer data from the local memory to the on-chip memory, but not without decreasing performance of the SoC. For example, central processing unit (CPU) of the SoC could provide the HWA sub-system usage of on-chip memory. However, this approach decreases CPU bandwidth and/or loading, decreases processing core speed, and cannot handle time critical processing needs with high interrupt rates such as, for example, few thousands per second.

FIG. 1 is a block diagram of an example computer architecture 100. The example computer architecture 100 includes an example SoC 105 and an example external memory 110.

The example SoC 105 may be implemented by any SoC including an example HWA sub-system 115. In one example, the example SoC 105 may be implemented by an automotive SoC, an industrial SoC, etc. The example SoC 105 includes the example HWA sub-system 115, an example display interface 120, an example camera interface 130, an example set of processors 135, and an example on-chip memory 140.

The example external memory 110 may be implemented by any memory such as, for example, at least one memory including cache(s), random-access memory(s), hard disk drive(s), flash memory(s), read-only memory(s), compact disk(s), digital versatile disk(s), external dynamic random-access memory (DRAM) memory, etc.

The example HWA sub-system 115 may be used to implement image processing functions such as IVAHD functions, VPAC functions, DMPAC functions, SIMCOP functions, etc. The example HWA sub-system 115 may perform tasks based on a message received by the example HWA sub-system 115. For example, the message may indicate to perform tasks computed more efficiently by the example HWA sub-system 115 compared to the example set of processors 135.

The example display interface 120 may be implemented by an interface circuit. However, any other type of circuitry may additionally or alternatively be used such as, for example, one or more analog or digital circuit(s), logic circuit(s), hardware processor(s), programmable processor(s), ASIC(s), PLD(s), FPLD(s), programmable controller(s), GPU(s), DSP(s), CGRA(s), ISP(s), etc. The example display interface 120 may send a message based on an input received by the example display interface 120.

The example camera interface 130 may be implemented by a camera serial interface (CSI) receiver. Alternatively, the example camera interface 130 may be implemented by any other receiver system interfacing between the example set of processors 135 and an output device. Any other type of circuitry may additionally or alternatively be used such as, for example, one or more analog or digital circuit(s), logic circuit(s), hardware processor(s), programmable processor(s), ASIC(s), PLD(s), FPLD(s), programmable controller(s), GPU(s), DSP(s), CGRA(s), ISP(s), etc. The example camera interface 130 may send a message based on an input received by the example camera interface 130.

A processor from the example set of processors 135 may be implemented by a hardware processor. However, any other type of circuitry may additionally or alternatively be used such as, for example, one or more analog or digital circuit(s), logic circuit(s), hardware processor(s), programmable processor(s), ASIC(s), PLD(s), FPLD(s), programmable controller(s), GPU(s), DSP(s), CGRA(s), ISP(s), ARM processor(s) etc. The processor from the example set of processors 135 may perform operations based on a message received by the processor. For example, the message may indicate to perform tasks computed more efficiently by the processor compared to the example HWA sub-system 115.

The example on-chip memory 140 may be implemented by at least one memory such as, for example, cache(s), random-access memory(s), hard disk drive(s), flash memory(s), read-only memory(s), compact disk(s), digital versatile disk(s), a shared level 3 cache (MSMC-L3), a static random-access memory (SRAM), an on-chip memory (OCM), etc. The example on-chip memory 140 may be included in a multicore shared memory controller (MSMC).

The example system control and data bus 145 may be utilized by the example HWA sub-system 115, the example display interface 120, the example camera interface 130, the example set of processors 135, and/or the example on-chip memory 140 to communicate with each other. The example display interface 120 and/or the example camera interface 130 may send a message to the example HWA sub-system 115 and/or the example set of processors 135 via the example system control and data bus 145. The example set of processors 135 may store data on the example on-chip memory 140 via the example system control and data bus 145. In some examples, the example HWA sub-system 115 includes an HTS, which may store data on the example on-chip memory 140. The example HWA sub-system 115 including an HTS to allow storage for the example on-chip memory 140 is disclosed further in connection with FIGS. 5-9.

The example external bus 150 may be utilized by the example set of processors 135 and/or the example HWA sub-system 115 to store and/or read data on the example external memory 110.

Figure 2:
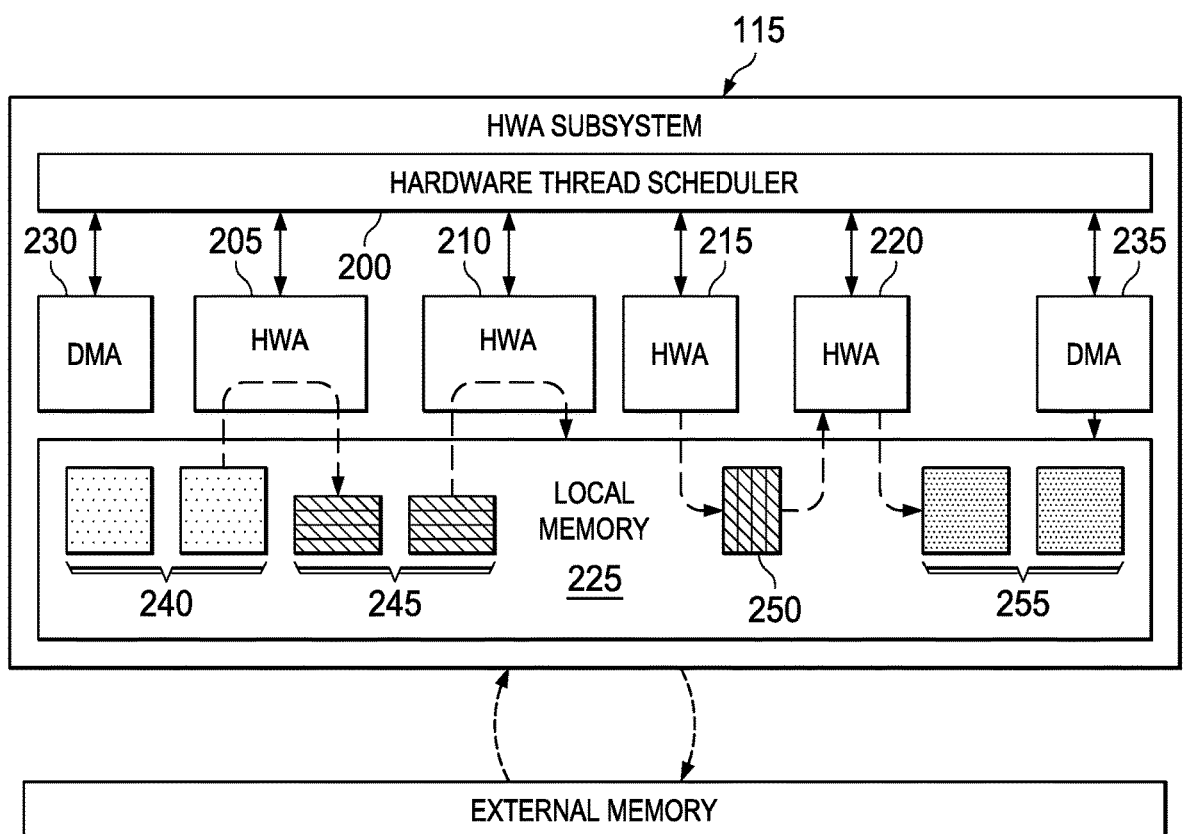
FIG. 2 is a block diagram showing additional detail of the example HWA sub-system of FIG. 1.

FIG. 2 is a block diagram showing additional detail of the example HWA sub-system 115 of FIG. 1. Additional elements that may be included in the HTS are disclosed in connection with FIGS. 5-9. In some examples, the example HWA sub-system 115 may be implemented by a VPAC unit. The example HWA sub-system 115 includes example HWAs 205, 210, 215, 220, an example local memory 225, example direct memory access (DMA) controllers 230, 235, and the example HTS 200.

The example HTS 200 is implemented by logic circuits. However, any other type of circuitry may additionally or alternatively be used such as, for example, one or more analog or digital circuit(s) etc. The example HTS 200 manages the example HWAs 205, 210, 215, 220. For example, the example HTS 200 may send instructions to initialize, read data from the example local memory 225, write data to the example local memory 225, etc. The example HTS 200 manages the example DMA controllers 230, 235. For example, the example HTS 200 may send instructions to the example DMA controllers 230, 235 that specify when to transfer data from the example local memory 225 to an external memory. The example HTS 200 may send instructions to the example DMA controllers 230, 235 that specify when to transfer data from the external memory to the example local memory 225. In this way, the example HTS 200 may effectively connect the example HWAs 205, 210, 215, 220 in a flexible data pipeline by instructing a first HWA from the example HWAs 205, 210, 215, 220 to write output data from the first HWA to the example local memory 225 and instructing the next HWA from the example HWAs 205, 210, 215, 220 in the sequence to read the output data from the first HWA in the example local memory 225. In contrast to a fixed data flow pipeline, the example HTS 200 can reconfigure and reorder the example HWAs 205, 210, 215, 220 in the flexible data pipeline on demand.

The example HWAs 205, 210, 215, 220 are implemented by logic circuits such as, for example, hardware processors. However, any other type of circuitry may additionally or alternatively be used such as, for example, one or more analog or digital circuit(s), programmable processor(s), ASIC(s), PLD(s), FPLD(s), programmable controller(s), GPU(s), DSP(s), CGRA(s), ISP(s), etc. Each of the example HWAs 205, 210, 215, 220 may consume and/or produce data, the data being organized into one or more data line(s) and/or data block(s). For example, the example HWA 205 may produce data in response to completion of a set of tasks by the example HWA 205. For example, the example HWA 210 may consume data in response to initiation of the set of tasks by the example HWA 210. Each of the example HWAs 205, 210, 215, 220 may perform at least one operation based on a task from the set of tasks received by each of the example HWAs 205, 210, 215, 220.

For example, the example HWA 205 may be a vision imaging sub system (VISS) accelerator to perform a set of tasks of an imaging function. For example, the example HWA 210 may be a LDC accelerator to perform a set of tasks of a distortion function. For example, the example HWA 215 may be a MSC accelerator to perform a set of tasks of a scalar function to perform. For example, the example HWA 220 may be a noise filter (NF) accelerator to perform a set of tasks of a NF function.

The example local memory 225 may be implemented by at least one memory. For example, the at least one memory may include cache(s), random-access memory(s), hard disk drive(s), flash memory(s), read-only memory(s), compact disk(s), digital versatile disk(s), level-2 shared cache (SL2) etc. The example local memory 225 may be designed based on design specifications. In some examples, the example local memory 225 in the above-described VPAC unit may be designed based on a design specification of the VPAC unit. For example, the design specification may call for size of the example local memory 225 to support for 8 megapixels images.

The example local memory 225 may be used to store example data 240, 245, 250, 255. Each of the example data 240, 245, 250, 255 is data stored during the data movement between the example HWAs 205, 210, 215, 220. For example, the example HWA 205 may store the example data 240 (e.g., a block-based output) to a buffer portion in the example local memory 225 that converts a block-based output having a first size to a line-based output having a second size. In some examples, the example data 245 is stored in a circular buffer in the example local memory 225. The example data 250 may be stored in a single buffer in the example local memory 225. For example, the example HWA 220 may store the example data 255 (e.g., a line-based output) to a buffer portion in the example local memory 225 that converts a line-based output having a first size to a block-based output having a second size. In some examples, a single data movement between the example HWA 205 and the example HWA 210 may require a memory capacity greater than the size of the example local memory 225. As a result, the example HTS 200 may include functionality to allow data movement from the example HWA 205 to the example HWA 210 utilizing the example local memory 225 described in more detail in connection to FIGS. 5-9 to support a connection between a first HWA from the example HWAs 205, 210, 215, 220 and a second HWA from the example HWAs 205, 210, 215, 220 that requires a memory larger than the example local memory 225.

The example DMA controllers 230, 235 are implemented by controllers. However, any other type of circuitry may additionally or alternatively be used such as, for example, logic circuit(s), hardware processor(s), one or more analog or digital circuit(s), programmable processor(s), ASIC(s), PLD(s), FPLD(s), programmable controller(s), GPU(s), DSP(s), CGRA(s), ISP(s), etc. The example DMA controller 230 may transfer data between the example local memory 225 and an external memory. The example DMA controller 230 may transfer data between the example local memory 225 and an on-chip memory.

Figure 3:
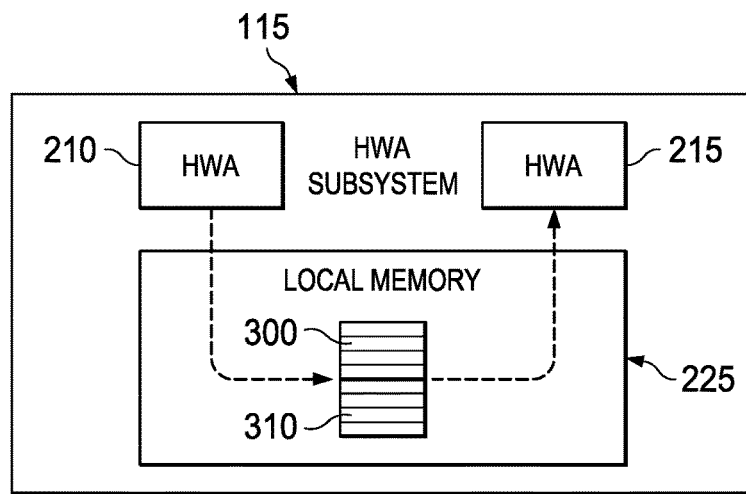
FIG. 3 is a block diagram showing an example data movement implementation of the example HWA sub-system of FIG. 1.

FIG. 3 is a block diagram showing an example data movement implementation of the example HWA sub-system 115 of FIG. 1. The example HWA sub-system 115 includes the example HWAs 210, 215 described in connection to FIG. 2 and the example local memory 225 described in connection to FIG. 2. In the example of FIG. 3, the size of the example local memory 225 has enough memory capacity to support the transfer of data between the example HWA 210 and the example HWA 215.

The example HWA sub-system 115 is configured to connect the example HWA 210 to the example HWA 215.

The example local memory 225 includes an example first data block 300 and an example second data block 310.

The example HWA 210 performs tasks to transfer data from the example HWA 210 to the example local memory 225. For example, the example HWA 210 transferred the example first data block 300 and the example second data block 310 to the example local memory 225 from the example HWA 210. The task performance may be managed by the example HTS 200 described in connection to FIG. 2.

The example HWA 215 performs tasks to transfer data from the example local memory 225 to the example HWA 215. For example, the example HWA 215 may transfer the example first data block 300 and the example second data block 310 from the example local memory 225 to the example HWA 215. The task performance may be managed by the example HTS 200 described in connection to FIG. 2

Figure 4:
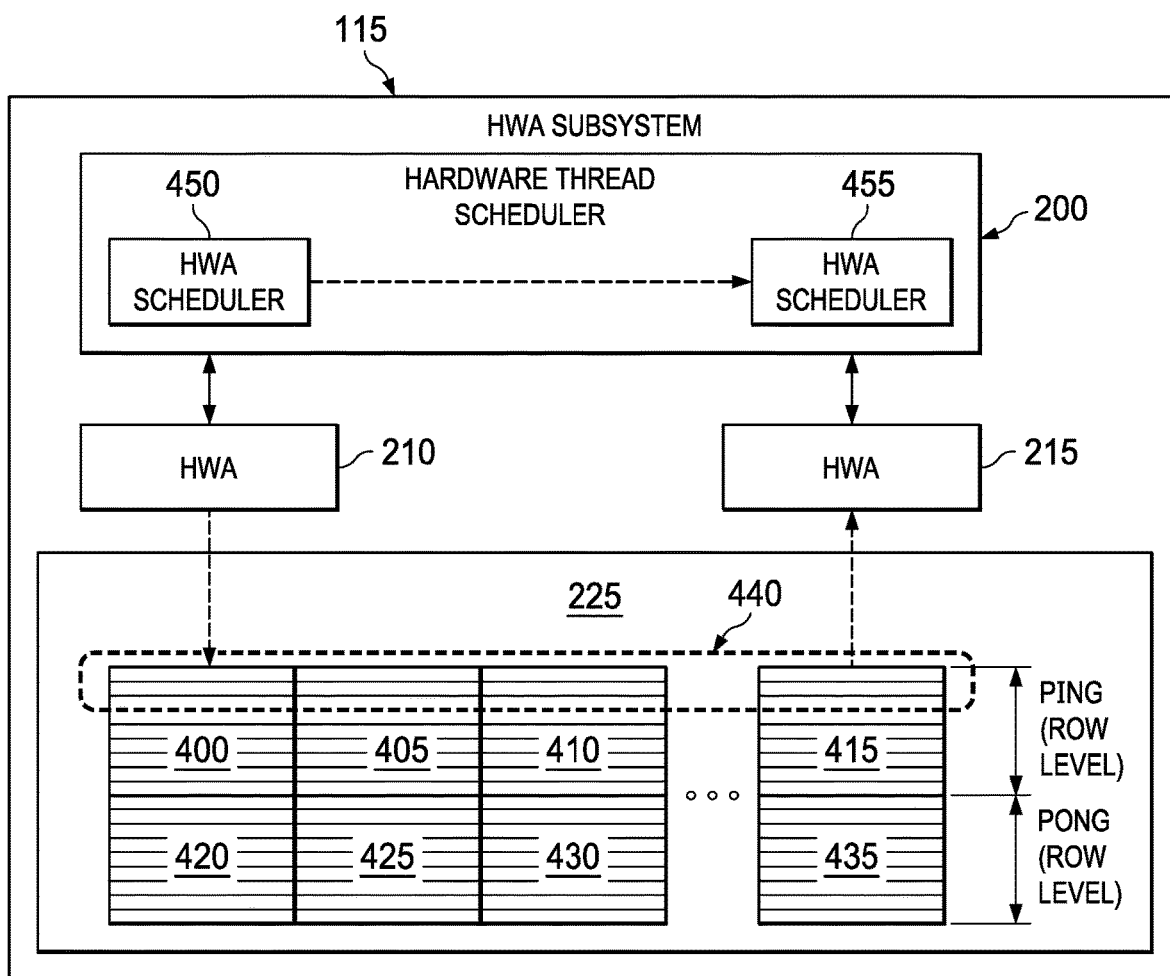
FIG. 4 is a block diagram including additional detail of the example data movement implementation of FIG. 3.

FIG. 4 is a block diagram including additional detail of the example data movement implementation of FIG. 3. The example HWA sub-system 115 includes the example HWAs 210, 215 described in connection to FIG. 2, the example local memory 225 described in connection to FIG. 2, and the example HTS 200 described in connection to FIG. 2.

The example HWA sub-system 115 is configured to connect the example HWA 210 to the example HWA 215.

The example HTS 200 includes an example HWA scheduler 450 and an example HWA scheduler 455. The example HWA scheduler 450 manages the task performance of the example HWA 210. The example HWA scheduler 455 manages the task performance of the example HWA 215. The arrow shown in FIG. 4 between the example HWA scheduler 450 and the example HWA scheduler 455 represents the defined flexible data pipeline (i.e., the example HWA 210 is connected to the example HWA 215).

The example HWA 210 has block-based outputs. The example HWA 210 performs tasks to transfer data blocks from the example HWA 210 to the example local memory 225. For example, the example HWA 210 transferred example data blocks 400, 405, 410, 415 to the example local memory 225 from the example HWA 210.

The example HWA 215 has line-based inputs. The example HWA 215 performs tasks to transfer data lines from the example local memory 225 to the example HWA 215. For example, the example HWA 215 transfers an example first data line 440 from the example local memory 225 to the example HWA 215. It is noted the example first data line 440 cannot be transferred from the example local memory 225 to the example HWA 215 until the example data blocks 400, 405, 410, 415 are aggregated in the example local memory 225.

A portion of the example local memory 225 may be arranged as a ping pong buffer. The example data blocks 400, 405, 410, 415 are the ping row level. The example data blocks 420, 425, 430, 435 are the pong row level. It is noted the example local memory 225 needs to be relatively large to handle the use-case graph connection to connect the example HWA 210 being a block-based output and the example HWA 215 being a line based-input. The solution to reduce the size of the example local memory 225 is described in connection to FIGS. 5-9.

Figure 5:
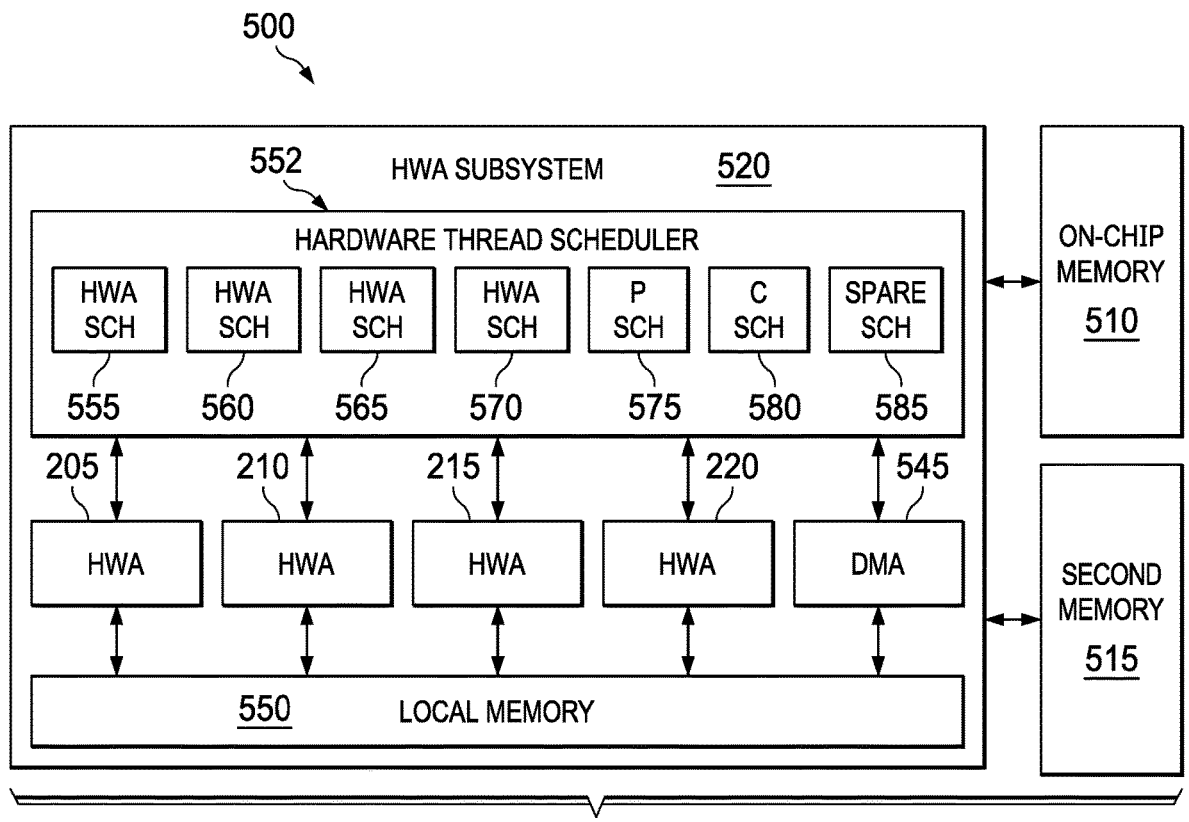
FIG. 5 is a block diagram of an example computer architecture including an example HWA sub-system, the example HWA sub-system including an example hardware thread scheduler (HTS) with additional elements.

FIG. 5 is a block diagram of an example computer architecture 500 including an example HWA sub-system 520, the example HWA sub-system 520 including an example HTS 552 with additional elements. The example computer architecture 500 includes an example on-chip memory 510, an example second memory 515, and the example HWA sub-system 520. The example HWA sub-system 520 includes example HWAs 205, 210, 215, 220 described in connection to FIG. 2, an example DMA controller 545, an example local memory 550, and the example HTS 552. The example HTS 552 includes example HWA schedulers 555, 560, 565, 570, an example spare scheduler 585, an example producer DMA scheduler 575, and an example consumer DMA scheduler 580.

The implementation of the example on-chip memory 510 is described in connection to the example on-chip memory 140 of FIG. 1. The example HWA sub-system 520 may store data on the example on-chip memory 510 via a system control and data bus.

The implementation of the example second memory 515 may be described in connection to the example on-chip memory 140 of FIG. 1 or the example external memory 110 of FIG. 1. The example HWA sub-system 520 may store data on the example second memory 515 via a system control and data bus. In some examples, the example second memory 515 may be in a second HWA sub-system on the example computer architecture 500.

The implementation of the example local memory 550 is described in connection to the example local memory 225 of FIG. 2. The example local memory 550 is designed based on the design specification. It is noted, data movement from the example HWA 205 to the example HWA 210 utilizing the example local memory 550 may be performed by example HWA sub-system 520. It is noted data movement from the example HWA 210 to the example HWA 215 utilizing the example local memory 550 may be performed by the example HWA sub-system 520.

The example HWA schedulers 555, 560, 565, 570 may be implemented by logic circuits. However, any other type of circuitry may additionally or alternatively be used such as, for example, one or more analog or digital circuit(s) etc. Each of the example HWA schedulers 555, 560, 565, 570 manages a corresponding HWA from the example HWAs 205, 210, 215, 220. For example, the example HWA scheduler 555 may manage the example HWA 205, the example HWA scheduler 560 may manage the example HWA 210, etc. Alternatively, more than one HWA scheduler may manage a HWA such as, for example, the HWA handles two sets of tasks managed by two HWA schedulers. The example HWA schedulers 555, 560, 565, 570 sends instructions to the corresponding example HWAs 205, 210, 215, 220. For example, the example HWA scheduler 555 may determine when the input data for the example HWA 205 is available in the example local memory 550 and send an instruction to perform a set of tasks on the input data to the example HWA 205. The set of tasks may include initializing the example HWA 205, the example HWA 205 reading input data from the example local memory 550, the example HWA 205 determining whether there is space in the example local memory 550 for the example HWA 205 to write output data to the example local memory 550, the example HWA 205 writing output data to the example local memory 550, etc.

The example spare scheduler 585 may be implemented by logic circuits. However, any other type of circuitry may additionally or alternatively be used such as, for example, one or more analog or digital circuit(s) etc. The example spare scheduler 585 may be inserted in the flexible data pipeline by specifying the preceding HWA(s) in the pipeline that provide input data and the HWA(s) in the pipeline that will operate on the input data. The example spare scheduler 585 may manage data movement of the input data between the example local memory 550 and the example on-chip memory 510 for not use-cases that require a memory larger than the local memory. For example, the example spare scheduler 585 includes a DMA trigger capability to send a DMA trigger instruction to the example DMA controller 545. For example, the example spare scheduler 585 may send a pattern adapter instruction to a second spare scheduler based on a pattern adapter. The pattern adapter trigger instruction may indicate for the second spare scheduler to begin managing data movement between the example local memory 550 and the example on-chip memory 510. In general, the example spare scheduler 585 acts as "a hanging node" to manage data movement between a first HWA from the example HWAs 205, 210, 215, 220 and a second HWA from the example HWAs 205, 210, 215, 220. The first HWA being any HWA from the example HWAs 205, 210, 215, 220. The second HWA being any HWA different than the first HWA from the example HWAs 205, 210, 215, 220. Further details are disclosed in FIGS. 6-9.

The implementation of the example DMA controller 545 is described in connection to the example DMA controllers 230, 235 of FIG. 2. The example DMA controller 545 transfers data between the example local memory 550 and the example on-chip memory 510 based on the example producer DMA scheduler 575 and/or the example consumer DMA scheduler 580.

The example producer DMA scheduler 575 may be implemented by logic circuits. However, any other type of circuitry may additionally or alternatively be used such as, for example, one or more analog or digital circuit(s) etc. The example producer DMA scheduler 575 may trigger the example DMA controller 545 to move data from the example on-chip memory 510 and/or the example second memory 515 to the example local memory 550.

The example consumer DMA scheduler 580 may be implemented by logic circuits. However, any other type of circuitry may additionally or alternatively be used such as, for example, one or more analog or digital circuit(s) etc. The example consumer DMA scheduler 580 may trigger the example DMA controller 545 to move data from the example local memory 550 to the example on-chip memory 510 and/or the example second memory 515.

Figure 6:
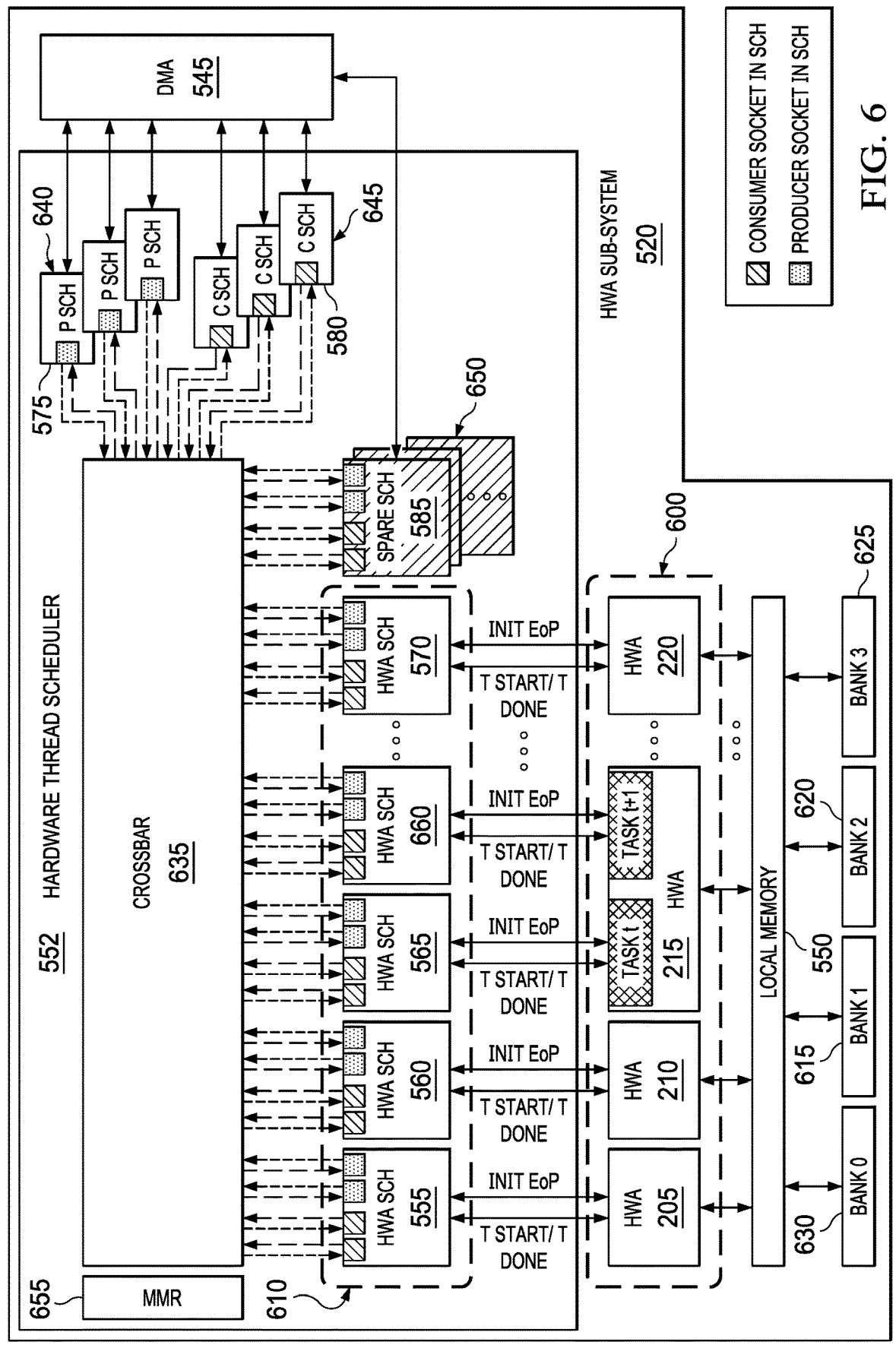
FIG. 6 is a block diagram showing additional detail of the example HWA sub-system of FIG. 5, the example HWA sub-system including the example HTS with additional elements.

FIG. 6 is a block diagram showing additional detail of the example HWA sub-system 520 of FIG. 5, the example HWA sub-system 520 including the example HTS 552 with additional elements. The example HWA sub-system 520 includes an example set of HWAs 600, the example DMA controller 545 described in connection to FIG. 5, the example local memory 550, example banks 615, 620, 625, 630 and an example HTS 552. The example HTS 552 includes an example set of HWA schedulers 610, an example set of producer DMA schedulers 640, an example set of consumer DMA schedulers 645, an example set of spare schedulers 650, an example memory mapped register (MMR) 655, and an example crossbar 635.

The implementation of the example local memory 550 is described in connection to FIG. 5. The example local memory 550 may be arranged as the example banks 615, 620, 625, 630. The example banks 615, 620, 625, 630 are known as memory banks. The memory banks are logical units of storage.

The example set of HWAs 600 may include the example HWAs 205, 210, 215, 220. The implementation of the example HWAs 205, 210, 215, 220 is described in connection to FIG. 2.

The example set of HWA schedulers 610 may include the example HWA schedulers 555, 560, 565, 570 and an example HWA scheduler 660. The implementation of the example HWA schedulers 555, 560, 565, 570 are described in connection to FIG. 5. Each HWA scheduler from the example set of HWA schedulers 610 may include a set of consumer sockets. Each consumer socket from the set of consumers sockets is associated with one or more input dependencies and determines when input data is available. Each producer socket from the set of producer sockets corresponds is associated with one or more output dependencies and determines when output data is available. The set of producer sockets may manage the initiation of producer tasks. Each of the example set of HWA schedulers 610 may initialize the corresponding HWA from the example set of HWAs 600. For example, the example HWA scheduler 555 may be enabled. The example HWA scheduler 555 may send an initialization instruction (e.g., INIT) to the example HWA 205 in response to the example HWA scheduler 555 being enabled. The example HWA scheduler 555 may send a task start instruction (e.g., T START) to the example HWA 205. The task start instruction may be sent in response to the example HWA 205 being initialized and a set of enabled consumer sockets and/or a set of enabled producer sockets being ready. The example HWA scheduler 555 may receive a task done instruction (e.g., T DONE) from the example HWA 205 in response to the task completion. The example HWA scheduler 555 may receive an end of pipeline instruction (e.g., EOP) in response to all tasks completed for the example HWA 205. More than one HWA scheduler from the example set of HWA schedulers 610 may manage a HWA from the example set of HWAs 600. For example, a first set of tasks (e.g., TASK t) may be managed by the example HWA scheduler 565. For example, a second set of tasks (e.g., TASK t+1) may be managed by the example HWA scheduler 660.

The example set of spare schedulers 650 may include the example spare scheduler 585. The implementation of the example spare scheduler 585 is described in connection to FIG. 5. Each of the example set of spare schedulers 650 may include a set of consumer sockets. Each consumer socket from the set of consumer sockets is associated with one or more input dependencies and determines when input data is available. Each of the example set of spare schedulers 650 may include a set of producer sockets. Each producer socket from the set of producer sockets is associated with one or more output dependencies and determines when output data is available The example set of consumer DMA schedulers 645 may include the example consumer DMA scheduler 580. The implementation of the example consumer DMA scheduler 580 is described in connection to FIG. 5. Each consumer scheduler from the example set of consumer DMA schedulers 645 is associated to a HWA scheduler from example set of HWA schedulers 610. Each of the consumer schedulers from the example set of consumer DMA schedulers 645 includes a consumer socket. The consumer socket may be connected to a producer socket from the set of the producer sockets of the HWA scheduler via the example crossbar 635.

The example set of producer DMA schedulers 640 may include the example producer DMA scheduler 575. The implementation of the example producer DMA scheduler 575 is described in connection to FIG. 5. Each producer scheduler from the example set of producer DMA schedulers 640 may be associated to a HWA scheduler from example set of HWA schedulers 610. Each of the producer schedulers from the example set of producer DMA schedulers 640 includes a producer socket. The producer socket may be connected to a consumer socket from the set of the consumer sockets of the HWA scheduler via the example crossbar 635.

The example crossbar 635 may be implemented by a crossbar switch including a set of switches. However, any other type of circuitry may additionally or alternatively be used such as, for example, one or more analog or digital circuit(s), logic circuit(s), etc. The example crossbar 635 may connect each consumer socket of the example set of spare schedulers 650 to each producer socket of the example set of HWA schedulers 610. The example crossbar 635 may connect each producer socket of the example set of spare schedulers 650 to each consumer socket of the example set of HWA schedulers 610. The example crossbar 635 may connect consumer sockets of the example set of spare schedulers 650 to producer sockets of the example set of spare schedulers 650. For example, the example crossbar 635 may connect a consumer socket of a first spare scheduler from the example set of spare schedulers 650 to a producer socket of a second spare scheduler from the example set of spare schedulers 650. The first spare scheduler different than the second spare scheduler. The example crossbar 635 may connect consumer sockets of the example set of consumer DMA schedulers 645 to the corresponding producer sockets of the example set of HWA schedulers 610. The example crossbar 635 connects producer sockets of the example set of producer DMA schedulers 640 to the corresponding consumer sockets of the example set of HWA schedulers 610.

The example MMR 655 is implemented by at least one memory such as, for example, cache(s), random-access memory(s), hard disk drive(s), flash memory(s), read-only memory(s), compact disk(s), digital versatile disk(s), etc. The example MMR 655 includes software settings, which provide instructions for the example set of HWA schedulers 610, the example set of spare schedulers 650, the example DMA controller 545, the example crossbar 635, etc. The example MMR 655 configures the flexible data pipeline based on the software settings. For example, the flexible data pipeline may configure a first connection (e.g., a first HWA from the example set of HWAs 600 is connected to a second HWA from the example set of HWAs 600), a second connection (e.g., the second HWA is connected to a third HWA from the example set of HWAs 600), a third connection (e.g., the third HWA is connected to a fourth HWA from the example set of HWAs 600), etc. As a result, the first HWA may perform a first set of tasks, the second HWA may perform a second set of tasks after the first set of tasks are complete, the third HWA may perform a third set of tasks after the second set of tasks are complete, etc. Alternatively, a HWA may be running in parallel, for example, with the first HWA.

In some examples, the first connection may include a data transfer that exceeds size of the example local memory 550, therefore the first connection may need to use the example on-chip memory 510. A first spare scheduler from the example set of spare schedulers 650 and a second spare scheduler from the example set of spare schedulers 650 may be inserted in the flexible data pipeline of the first connection. Alternatively, a series of spare schedulers from the example set of spare schedulers 650 may be inserted in the flexible data pipeline. For example, the example MMR 655 may configure the first connection in response to completion a task by the first HWA. The first connection may connect a consumer socket of a consumer scheduler from the example set of consumer DMA schedulers 645 and a producer socket of the first HWA scheduler via the example crossbar 635. Additionally, the first connection may connect a consumer socket of a first spare scheduler from the example set of spare schedulers 650 and a producer socket of the first HWA scheduler. For example, the example MMR 655 may configure the first connection in response to completion of a task by the second HWA. The first connection may connect a producer socket of a producer scheduler from the example set of producer DMA schedulers 640 connected to a consumer socket of the first HWA scheduler via the example crossbar 635. Additionally, the first connection may connect a consumer socket of a second spare scheduler from the example set of spare schedulers 650 and a producer socket of the second HWA scheduler. Additionally, the first connection may connect the first spare scheduler to a second spare scheduler from the example set of spare schedulers 650 in response to data movement by the example DMA controller 545.

Figure 7:
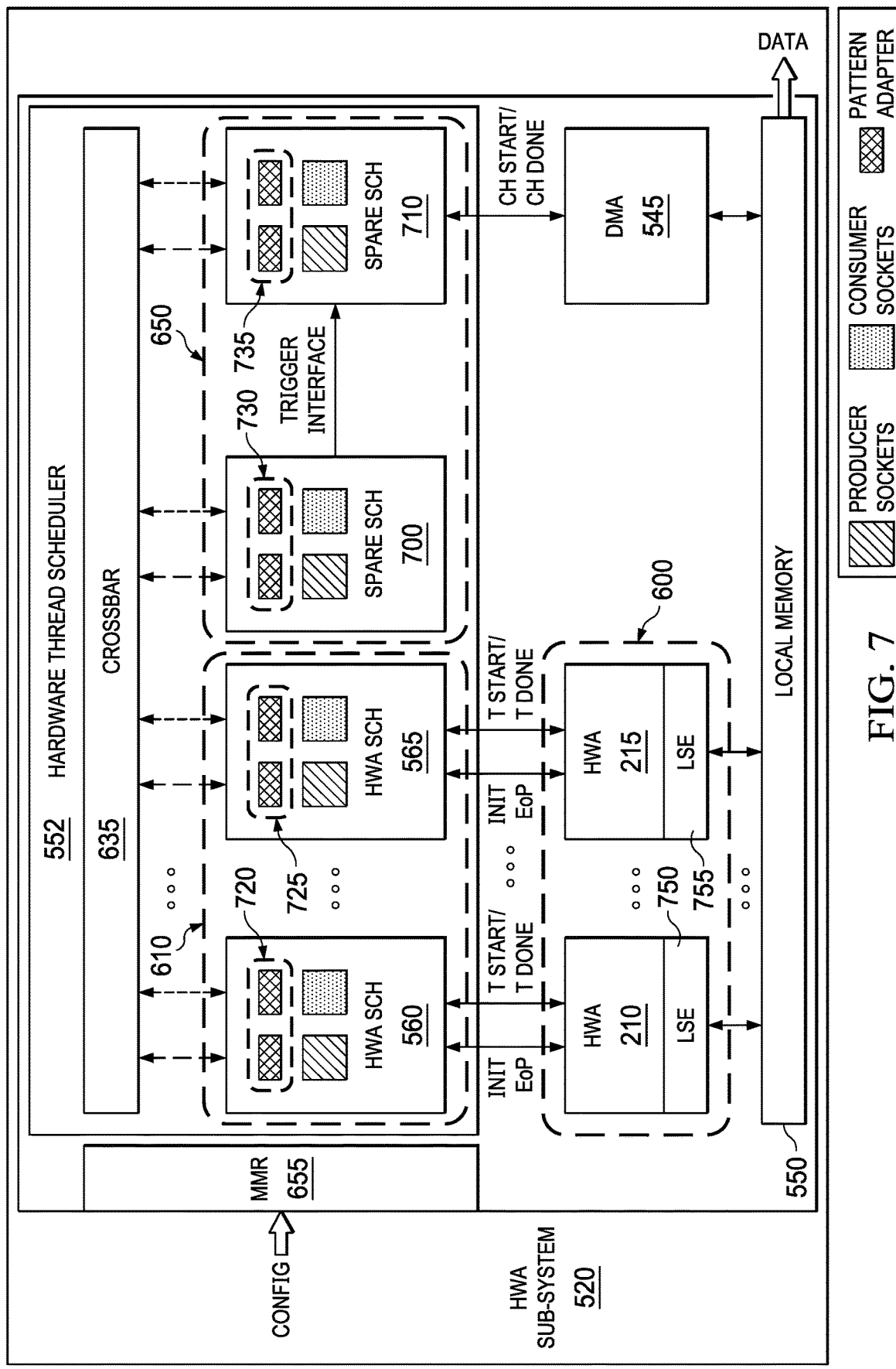
FIG. 7 is a block diagram showing additional detail of the example set of spare schedulers of the example HWA sub-system of FIG. 6, the example HWA sub-system including the example HTS with additional elements.

FIG. 7 is a block diagram showing additional detail of the example set of spare schedulers 650 of the example HWA sub-system 520 of FIG. 6, the example HWA sub-system 520 including the example HTS 552 with additional elements. The example HWA sub-system 520 includes, the example MMR 655 described in connection to FIG. 6, the example HWAs 210, 215 described in connection to FIG. 2, the example DMA controller 545 described in connection to FIG. 5, the example local memory 550 described in connection to FIG. 5, and the example HTS 552 described in connection to FIG. 5. The example HTS 552 includes the example crossbar 635 described in connection to FIG. 6, the example HWA schedulers 560, 565 described in connection to FIG. 5, an example first spare scheduler 700 from the example set of spare schedulers 650 described in connection to FIG. 6, and an example second spare scheduler 710 from the example set of spare schedulers 650.

The example HWAs 210, 215 may include example load store engines (LSEs) 750, 755 to move data from the example local memory 550 to an internal memory in the example HWAs 210, 215. For example, the example LSE 750 may move data between the example local memory 550 and an internal memory of the example HWA 210. For example, the example LSE 755 may move data between the example local memory 550 and an internal memory of the example HWA 215.

The example DMA controller 545 may manage data (e.g., DATA) movement from the example local memory 550 to an on-chip memory, an external memory, etc.

The example HWA schedulers 560, 565 may include an example sets of pattern adapters 720, 725. The example HWA scheduler 560 manages the task performance of the example HWA 210. The example HWA scheduler 565 manages the task performance of the example HWA 215. A pattern adapter from the example sets of pattern adapters 720, 725 may be enabled to perform count adaptation.

The example MMR 655 configures the example crossbar 635 based on an input (e.g., CONFIG) received by the example MMR 655. For example, the example MMR 655 stores configurations of the example crossbar 635. The example MMR 655 may configure the example HWA 210 to be connected to the example HWA 215, along with the example first spare scheduler 700 and the example second spare scheduler 710 inserted in the flexible data pipeline. As a result, the example MMR 655 configures a producer socket from the set of producer sockets of the example HWA scheduler 560 to connect to a consumer socket from the set of consumer sockets of the example first spare scheduler 700. Additionally, as a result, the example MMR 655 configures a consumer socket from the set of consumer sockets of the example HWA scheduler 565 to connect to a producer socket from the set of producer sockets of the example second spare scheduler 710.

The example first spare scheduler 700 includes an example set of pattern adapters 730. The example set of pattern adapters 730 may be enabled to perform count adaptation. In some examples, the example HWA 210 is connected to the example HWA 215. The example first spare scheduler 700 may determine when to send a DMA trigger to the example DMA controller 545 based on the example HWA scheduler 560. For example, the example first spare scheduler 700 may obtain information from the example HWA scheduler 560 indicating the example local memory 550 includes data to be transferred to the on-chip memory. In some examples, a pattern adapter instruction (e.g., TRIGGER INTERFACE) may be sent to the example second spare scheduler 710 when the on-chip memory includes data to be transferred to the example local memory 550 based on a pattern adapter from the example set of pattern adapters 730.

The example second spare scheduler 710 includes an example set of pattern adapters 735. The example second spare scheduler 710 may be enabled based on obtaining the pattern adapter instruction (e.g., TRIGGER INTERFACE). The example second spare scheduler 710 may determine when to send a DMA trigger (e.g., CH START) to the example DMA controller 545 based on the example HWA scheduler 565. Alternatively, the example second spare scheduler 710 may determine when to send a DMA trigger instruction based on the pattern adapter instruction obtained from the example first spare scheduler 700 indicating the on-chip memory includes data to be transferred to the example local memory 550. The example set of pattern adapters 735 may be enabled to perform count adaptation. The example second spare scheduler 710 may determine when to send a DMA trigger instruction based on at least one pattern adapter from the example set of pattern adapters 735. The example second spare scheduler 710 may receive a DMA transfer completion (e.g., CH DONE) from the example DMA controller 545 in response to the example DMA controller 545 transferring data from the on-chip memory to the example local memory 550.

Figure 8:
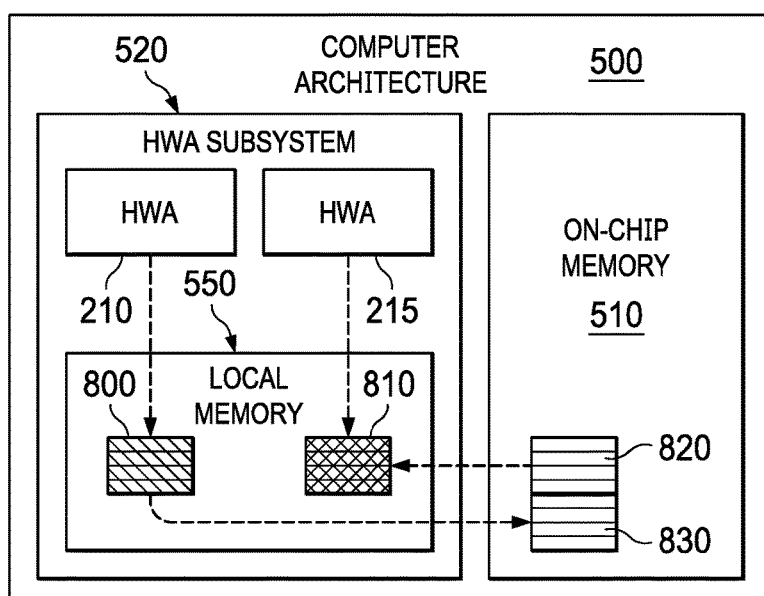
FIG. 8 is a block diagram showing an example data movement implementation of the example computer architecture of FIG. 5, the example computer architecture including an example HTS with additional elements.

FIG. 8 is a block diagram showing an example data movement implementation of the example computer architecture 500 of FIG. 5, the example computer architecture 500 including an example HTS 552 with additional elements. The example computer architecture 500 includes the example HWA sub-system 520 described in connection to FIG. 5 and the example on-chip memory 510 described in connection to FIG. 5. The example HWA sub-system 520 includes the example HWAs 210, 215 described in connection to FIG. 2 and the example local memory 550 described in connection to FIG. 5.

The example HWA sub-system 520 is configured to connect the example HWA 210 to the example HWA 215.

The example local memory 550 includes an example first data 800 and an example fourth data 810.

The example on-chip memory 510 includes an example second data 820 and an example third data 830.

The example HWA 210 performs tasks to transfer data from the example HWA 210 to the example local memory 550. For example, the example HWA 210 transferred the example first data 800 from the example HWA 210 to the example local memory 550. The task performance of the example HWA 210 may be managed by the example HWA scheduler 560 described in connection to FIG. 5.

The example first spare scheduler 700 (not shown in FIG. 8) described in connection to FIG. 7 may manage a DMA to perform tasks to transfer data from the example local memory 550 to the example on-chip memory 510. For example, the DMA transferred the example second data 820 and the example third data 830 from the example local memory 550 to the example on-chip memory 510.

The example second spare scheduler 710 (not shown in FIG. 8) described in connection to FIG. 7 may manage the DMA to perform tasks to transfer data from the example on-chip memory 510 to the example on-chip memory 510. For example, the DMA transferred the example fourth data 810 from the example on-chip memory 510 to the example local memory 550.

The example HWA 215 performs tasks to transfer data from the example local memory 550 to the example HWA 215. For example, the example HWA 215 may transfer the example fourth data 810 from the example local memory 550 to the example HWA 215. The task performance of the example HWA 215 may be managed by the example HWA scheduler 565 described in connection to FIG. 5.

Figure 9:
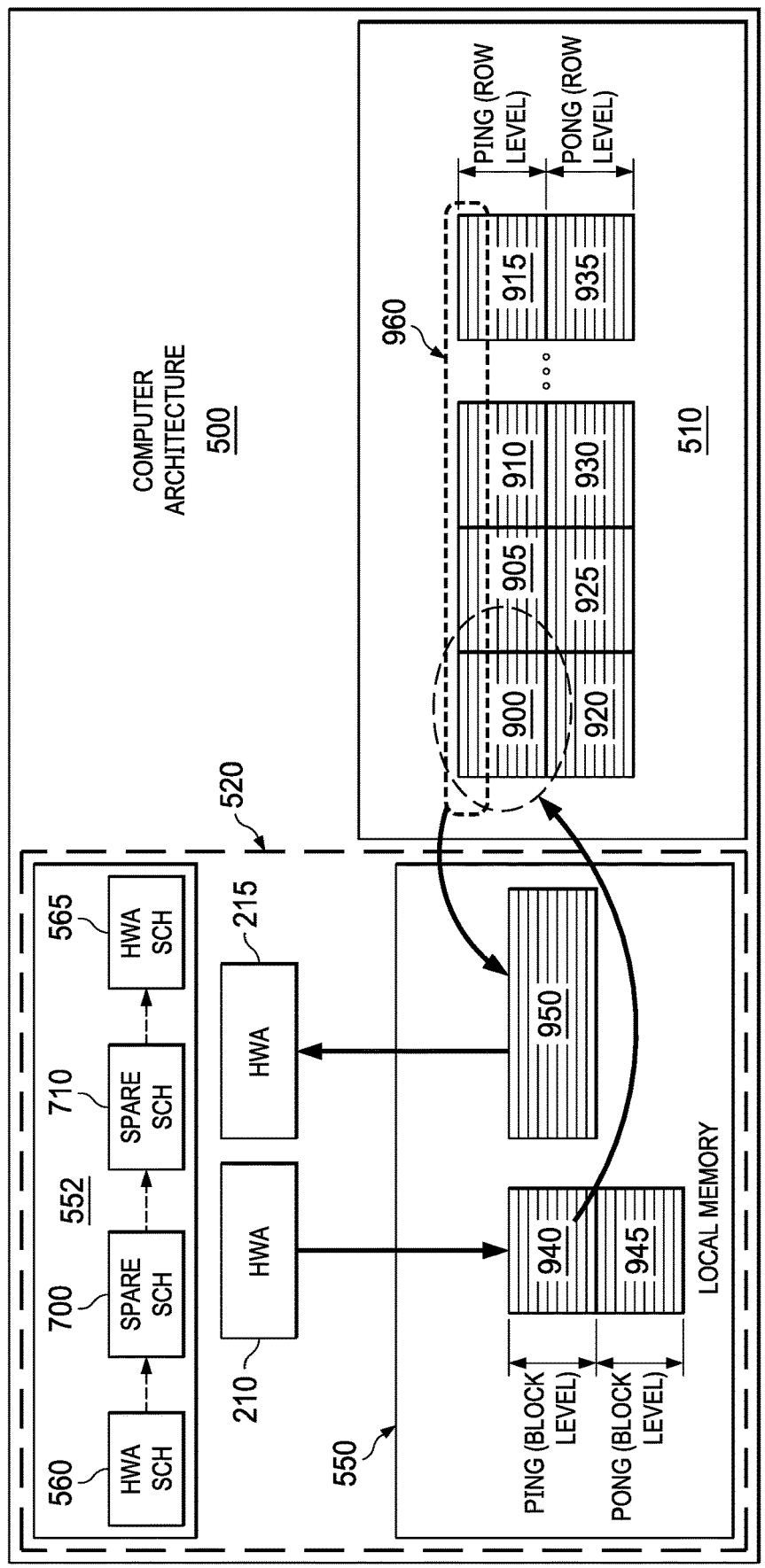
FIG. 9 is a block diagram including additional detail of the example data movement implementation of FIG. 8.

FIG. 9 is a block diagram including additional detail of the example data movement implementation of FIG. 8. The example computer architecture 500 includes the example HWA sub-system 520 described in connection to FIG. 5 and the example on-chip memory 510 described in connection to FIG. 5. The example HWA sub-system 520 includes the example HWAs 210, 215 described in connection to FIG. 2, the example local memory 550 described in connection to FIG. 5, and the example HTS 552 described in connection to FIG. 5.

The example HWA sub-system 520 is configured to connect the example HWA 210 to the example HWA 215.

The example HWA 210 has block-based outputs. The example HWA scheduler 560 may manage the task performance of the example HWA 210. The example HWA 210 performs tasks to transfer data blocks from the example HWA 210 to the example local memory 550. For example, the example HWA 210 transferred the example data block 940 to the example local memory 550 from the example HWA 210.

The example HWA 215 has line-based inputs. The example HWA scheduler 565 may manage the task performance of the example HWA 215. The example HWA 215 performs tasks to transfer data lines from the example local memory 550 to the example HWA 215. For example, the example HWA 215 may transfer an example first set of data lines 950 from the example local memory 550 to the example HWA 215.

A portion of the example local memory 550 may be arranged as a ping pong buffer. The ping pong buffer may include the example data block 940 and the example data block 945. For example, the example data block 940 may be the ping block level. For example, the example data block 945 may be the pong row level. The example local memory 550 includes the example first set of data lines 950.

A portion of the example on-chip memory 510 may be arranged as a ping pong buffer. The ping pong buffer may include the example data blocks 900, 905, 910, 915, 920, 925, 930, 935. For example, the example data blocks 900, 905, 910, 915 may be the ping row level. For example, the example data blocks 920, 925, 930, 935 may be the pong row level.

The example HTS 552 includes example HWA schedulers 560, 565 described in connection to FIG. 5, the example first spare scheduler 700 described in connection to FIG. 7, and the example second spare scheduler 710 described in connection to FIG. 7. The example HWA scheduler 560 manages the task performance of the example HWA 210. The example first spare scheduler 700 manages the task performance of the DMA transferring data blocks from the example local memory 550 to the example on-chip memory 510. The example second spare scheduler 710 manages the task performance of the DMA transferring data blocks from the example on-chip memory 510 to the example local memory 550. The arrows shown in FIG. 9 between the example HWA schedulers 560, 565, the example first spare scheduler 700, and the example second spare scheduler 710 represent how the example first spare scheduler 700 and the example second spare scheduler are inserted in the flexible data pipeline (i.e., the example HWA 210 is connected to the example HWA 215).

The example first spare scheduler 700 described in connection to FIG. 7 may manage a DMA to perform tasks to transfer data from the example local memory 550 to the example on-chip memory 510. The example first spare scheduler 700 may manage movement of data blocks from the example local memory 550 to the example on-chip memory 510. The example first spare scheduler 700 may send a pattern adapter instruction based on the example set of pattern adapters 730 to an example second spare scheduler 710. The pattern adapter instruction may be sent in response to a set of data blocks aggregated on the example on-chip memory 510. The set of data blocks may be based on the line-based input of the example HWA 215. For example, the example first spare scheduler 700 may manage movement of a set of data blocks including the example data blocks 900, 905, 910, 915 from the example local memory 550 to the example on-chip memory 510. The example first spare scheduler 700 may send a pattern adapter instruction to the example second spare scheduler 710 in response to the set of data blocks aggregated on the example on-chip memory 510.

The example second spare scheduler 710 described in connection to FIG. 7 may manage a DMA to perform tasks to transfer data from the example on-chip memory 510 to the example local memory 550. For example, the example second spare scheduler 710 may begin to manage data movement in response to obtaining the pattern adapter instruction from the example first spare scheduler 700. The example second spare scheduler 710 may have managed movement of the example first set of data lines 950 from the example on-chip memory 510 to the example local memory 550 in response to a set of data blocks aggregated on the example on-chip memory. For example, the set of data blocks aggregated provide the size for the line-based input of the example HWA 215. The example second spare scheduler 710 may manage movement of the example second set of data lines 960 from the example on-chip memory 510 to the example local memory 550 in response to a set of data blocks aggregated on the example on-chip memory 510. For example, the set of data blocks aggregated may include the example data blocks 900, 905, 910, 915. The set of data blocks may provide the size for the line-based input of the example HWA 215.

While an example manner of implementing the example computer architecture 500 of FIG. 5 is illustrated in FIGS. 5, 6, 7, 8, and 9 one or more of the elements, processes and/or devices illustrated in FIGS. 5, 6, 7, 8, and 9 may be combined, divided, re-arranged, omitted, eliminated and/or implemented in any other way. Further, the example on-chip memory 510, the example second memory 515, and/or the example HWA sub-system 520 of FIG. 5 may be implemented by hardware, software, firmware and/or any combination of hardware, software and/or firmware. Thus, for example, any of the example on-chip memory 510, the example second memory 515, the example HWA sub-system 520 of FIG. 5, and/or, more generally, the example computer architecture 500 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example on-chip memory 510, the example second memory 515, the example HWA sub-system 520 of FIG. 5, and/or, more generally, the example computer architecture 500 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computer architecture 500 of FIG. 5 may include one or more elements, processes and/or devices in addition to, or instead of, those illustrated in FIGS. 5, 6, 7, 8, and 9, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
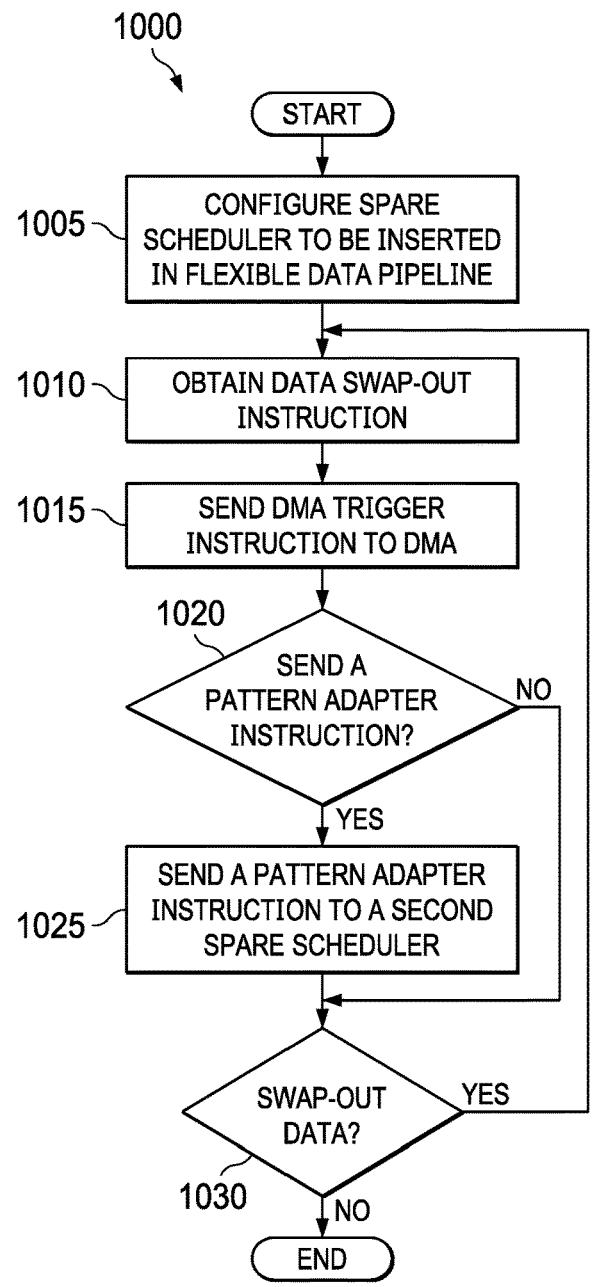
FIG. 10 is a flowchart representative of machine-readable instructions which may be executed to implement the example first spare scheduler to manage data movement from the example local memory to the example on-chip memory.
Figure 11:
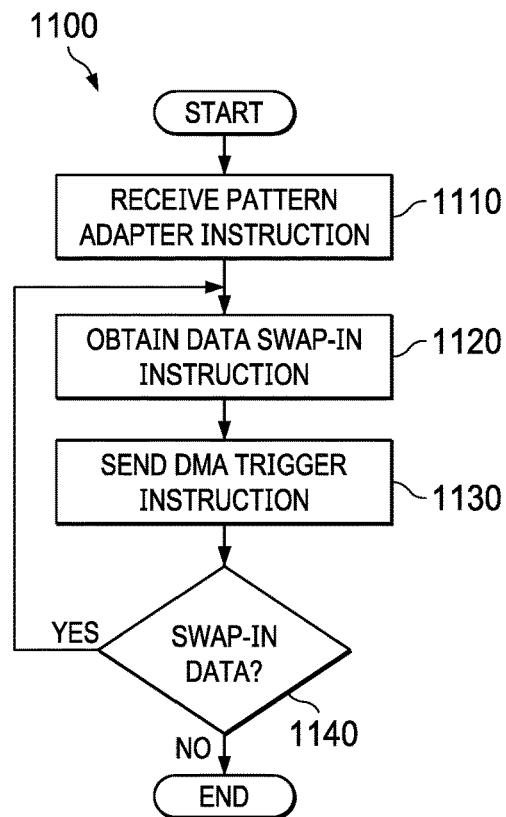
FIG. 11 is a flowchart representative of machine-readable instructions which may be executed to implement the example second spare scheduler to manage data movement from the example on-chip memory to the example local memory.

A flowchart representative of example hardware logic, machine readable instructions, hardware implemented state machines, and/or any combination thereof for implementing the example computer architecture 500 of FIG. 5 is shown in FIGS. 10 and 11. The machine readable instructions may be one or more executable programs or portion(s) of an executable program for execution by a computer processor and/or processor circuitry, such as the processor 1212 shown in the example processor platform 1200 discussed below in connection with FIGS. 10 and 11. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10 and 11, many other methods of implementing the example HTS 552 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of machine-readable instructions which may be executed to implement the example first spare scheduler 700 to manage data movement from the example local memory 550 to the example on-chip memory 510. Alternatively, the example first spare scheduler 700 may manage data movement from the example local memory 550 to other system memory such as, for example, an external memory. The example program 1000 begins when the example first spare scheduler 700 is configured to be inserted in a flexible data pipeline connecting the example HWA 210 and the example HWA 215. (Block 1005). Alternatively, any other HWA from the examples set of HWAs 600 may be connected. For example, the example first spare scheduler 700 may be configured to be inserted in the flexible data pipeline in response to a connection between a producer socket of the example HWA scheduler 560 and a consumer socket of the example first spare scheduler 700. The example first spare scheduler 700 obtains a data swap-out instruction. (Block 1010). The data swap-out instruction may indicate the example local memory 550 includes input data to be transferred to the example on-chip memory 510. For example, the data swap-out instruction may be obtained by at least one consumer socket from the set of consumer sockets of the example first spare scheduler 700. The example first spare scheduler 700 sends a DMA trigger instruction to the example DMA controller 545. (Block 1015). For example, the DMA trigger instruction may indicate the example DMA controller 545 needs to move a data block in the example local memory 550 to the example on-chip memory 510. The example first spare scheduler 700 determines whether to send a pattern adapter instruction to the example second spare scheduler 710. (Block 1020). For example, the example first spare scheduler 700 may send the pattern adapter instruction based on information from the example set of pattern adapters 730 on the example first spare scheduler 700 and/or information from the example set of pattern adapters 720 on the example HWA scheduler 560. If the example first spare scheduler 700 determines to send a pattern adapter instruction to the example second spare scheduler 710 (e.g., Block 1020 returns a result of "YES"), the example first spare scheduler 700 sends a pattern adapter instruction to the example second spare scheduler 710. (Block 1025). The example first spare scheduler 700 determines whether additional data is to be transferred from the example local memory 550 to the example on-chip memory 510. (Block 1030). For example, the example first spare scheduler 700 may determine whether additional data is to be transferred from the example local memory 550 to the example on-chip memory 510 based on information from the example set of pattern adapters 730 on the example first spare scheduler 700 and/or information from the example set of pattern adapters 720 on the example HWA scheduler 560. If the example first spare scheduler 700 determines there is data to be transferred from the example local memory 550 to the example on-chip memory 510 (e.g., Block 1030 returns a result of "YES"), the example first scheduler 700 returns to block 1010. If the example first spare scheduler 700 determines there is no data to be transferred from the example local memory 550 to the example on-chip memory 510 (e.g., Block 1030 returns a result of "NO"), the example program 1000 terminates.

If the example first spare scheduler 700 determines to not send a pattern adapter instruction to the second spare scheduler (e.g., Block 1020 returns a result of "NO"), the example first spare scheduler 700 continues to Block 1030.

FIG. 11 is a flowchart representative of machine-readable instructions which may be executed to implement the example second spare scheduler 710 to manage data movement from the example on-chip memory 510 to the example local memory 550. Alternatively, the example first spare scheduler 700 may manage data movement to the example local memory 550 from other system memory such as, for example, an external memory. The example program 1100 begins when the example second spare scheduler 710 obtains a pattern adapter instruction to begin managing data movement between the example HWA 210 and the example HWA 215. (Block 1110). The pattern adapter instruction may indicate the example second spare scheduler 710 is inserted in the flexible data pipeline of the example HWA 210 connected to the example HWA 215. The example second spare scheduler 710 obtains a data swap-in instruction. (Block 1120). For example, the example second spare scheduler 710 may obtain information from the example HWA scheduler 565 and/or the example first spare scheduler 700 indicating the example on-chip memory 510 includes data to be transferred to the example local memory 550. The example second spare scheduler 710 sends a DMA trigger instruction to the example DMA controller 545. (Block 1130). For example, the DMA trigger instruction may indicate the example DMA controller 545 needs to move data from the example on-chip memory 510 to the example local memory 550. The example second spare scheduler 710 determines whether there is data to be transferred from the example on-chip memory 510 to the example local memory 550. (Block 1140). For example, the example second spare scheduler 710 may determine whether there are data lines to be transferred from the example on-chip memory 510 to the example local memory 550. If example second spare scheduler 710 determines there is data to be transferred from the example on-chip memory 510 to the example local memory 550 (e.g., Block 1140 returns a result of "YES"), the example second spare scheduler 710 returns to block 1120. If example second spare scheduler 710 determines there is no data to be transferred from the example on-chip memory 510 to the example local memory 550 (e.g., Block 1140 returns a result of "NO"), the example program 1100 terminates.

Figure 12:
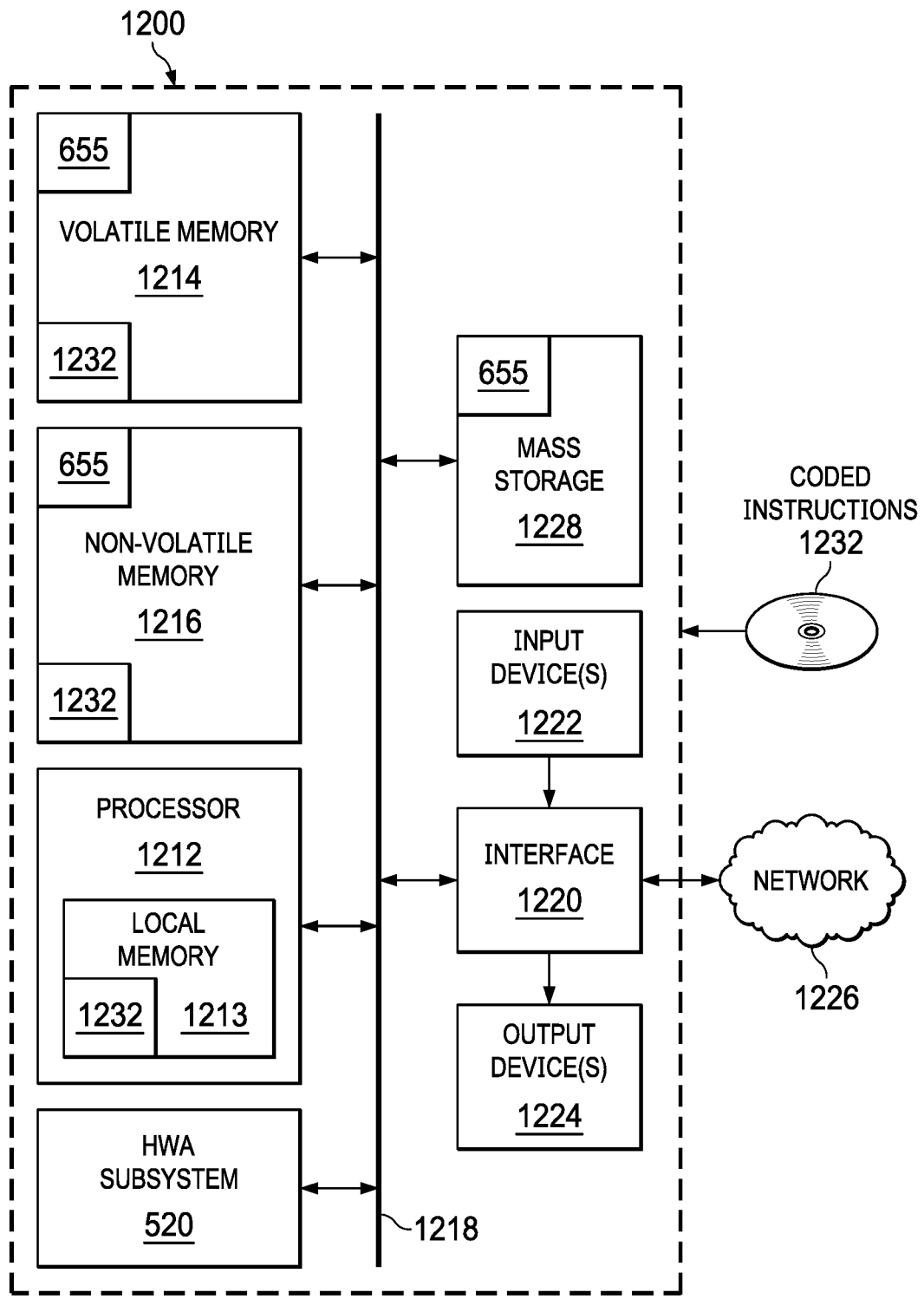
FIG. 12 is a block diagram of an example processor platform structured to execute the instructions of FIGS. 10 and 11 to implement the example computer architecture 500 of FIG. 5.

FIG. 12 is a block diagram of an example processor platform 1200 structured to execute the instructions of FIGS. 10 and 11 to implement the example computer architecture of FIG. 5. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes the example HWA sub-system 520 described in connection to FIG. 5.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 10 and 11 may be stored in the mass storage device 1228, in the volatile memory 1214, in the non-volatile memory 1216, and/or on a removable non-transitory computer readable storage medium such as a CD or DVD.

Figure 13:
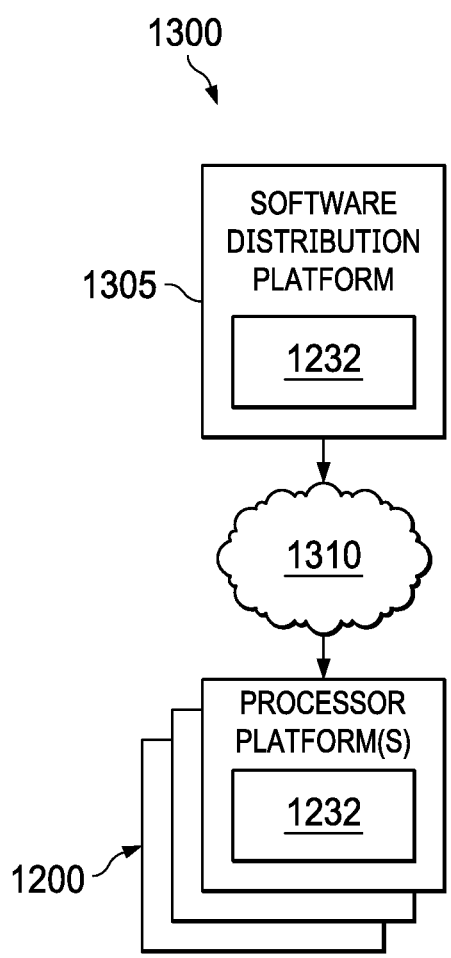
FIG. 13 is a block diagram of an example software distribution platform to distribute software (e.g., software corresponding to the example computer readable instructions of FIGS. 10 and 11) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1232 of FIGS. 10 and 11 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the example software distribution platform 1305. For example, the entity that owns and/or operates the example software distribution platform 1305 may be a developer, a seller, and/or a licensor of software such as the example computer readable instructions 1232 of FIGS. 10 and 11. The third parties may be consumers, users, retailers, OEMs, etc., who purchase and/or license the software for use and/or re-sale and/or sub-licensing. In the illustrated example, the example software distribution platform 1305 includes one or more servers and one or more storage devices. The storage devices store the computer readable instructions 1232, which may correspond to the example computer readable instructions 1232 of FIGS. 9 and 10, as described above. The one or more servers of the example software distribution platform 1305 are in communication with a network 1310, which may correspond to any one or more of the Internet and/or any of the example networks 1226 described above. In some examples, the one or more servers are responsive to requests to transmit the software to a requesting party as part of a commercial transaction. Payment for the delivery, sale and/or license of the software may be handled by the one or more servers of the example software distribution platform 1305 and/or via a third party payment entity. The servers enable purchasers and/or licensors to download the computer readable instructions 1232 from the example software distribution platform 1305. For example, the software, which may correspond to the example computer readable instructions 1232 of FIGS. 10 and 11, may be downloaded to the example processor platform 1200, which is to execute the computer readable instructions 1232 to implement the apparatus of FIG. 5. In some examples, one or more servers of the example software distribution platform 1305 periodically offer, transmit, and/or force updates to the software (e.g., the example computer readable instructions 1232 of FIGS. 10-11) to ensure improvements, patches, updates, etc. are distributed and applied to the software at the end user devices.

From the foregoing, it will be appreciated that example methods, apparatus and articles of manufacture have been disclosed that implement a HWA sub-system including a hardware thread scheduler (HTS) to allow a local memory with reduced size based on the use-cases of the HWA sub-system, while not decreasing performance of the SoC. If the memory usage of a particular application should exceed the available local memory size, local buffer extension may be performed to control data movement between local memory and other system memory such as, for example, on-chip memory and/or external memory, which allows the other system memory to act as an extension of the local memory. The HTS may include additional elements such as, for example, a set of spare schedulers to manage this data movement, in essence "extending" the local memory. Data aggregation may be performed in the memory. Additionally, the memory may be utilized for conversion between data line and data block. The disclosed methods, apparatus and articles of manufacture improve the efficiency of using a computing device by allowing the HWA sub-system to utilize other system memory, while not decreasing performance of the SoC. The disclosed methods, apparatus and articles of manufacture are accordingly directed to one or more improvement(s) in the functioning of a computer.

Example methods, apparatus, systems, and articles of manufacture to extend local buffer of a hardware accelerator are disclosed herein. Further examples and combinations thereof include the following:

Example 1 includes an apparatus, comprising a local memory, a first hardware accelerator (HWA), a second HWA, the second HWA and the first HWA connected in a flexible data pipeline, and a spare scheduler to manage, in response to the spare scheduler inserted in the flexible data pipeline, data movement between the first HWA and the second HWA through the local memory and a memory.

Example 2 includes the apparatus of example 1, wherein the data movement is performed by a direct memory access (DMA) controller.

Example 3 includes the apparatus of example 2, wherein the spare scheduler sends a DMA trigger instruction to the DMA controller to send data between the local memory and the memory.

Example 4 includes the apparatus of example 1, further including a memory mapped register to configure the flexible data pipeline.

Example 5 includes the apparatus of example 1, wherein the memory is an on-chip memory or an external memory.

Example 6 includes the apparatus of example 1, wherein the spare scheduler includes a set of pattern adapters.

Example 7 includes the apparatus of example 6, further including a second spare scheduler.

Example 8 includes the apparatus of example 7, wherein the spare scheduler is to send a pattern adapter instruction to the second spare scheduler based on the set of pattern adapters.

Example 9 includes the apparatus of example 8, wherein the second spare scheduler is to manage data movement between the local memory and the memory in response to obtaining the pattern adapter instruction.

Example 10 includes the apparatus of example 9, wherein the spare scheduler is to manage data movement from the local memory to the memory, and the second spare scheduler is to manage data movement from the second spare scheduler to the local memory.

Example 11 includes a method to manage a spare scheduler, the method comprising managing, in response to obtaining a manage instruction, data movement between a first HWA and a second HWA, sending, in response to obtaining a data swap-out instruction, a first DMA trigger instruction to a direct memory access (DMA) controller to transfer first data produced by the first HWA from a local memory to a memory, and sending, in response to obtaining a data swap-in instruction, a second DMA trigger instruction to the DMA controller to transfer second data to be consumed by the second HWA from the memory to the local memory.

Example 12 includes the method of example 11, further including sending a pattern adapter instruction to a spare scheduler.

Example 13 includes the method of example 12, wherein sending the pattern adapter instruction is based on a set of pattern adapters.

Example 14 includes the method of example 11, wherein the memory is an on-chip memory.

Example 15 includes the method of example 11, wherein the manage instruction indicates the memory is used for the data movement between the first HWA and the second HWA.

Example 16 includes the method of example 11, wherein the first data is produced by the first HWA in response to completion of a task by the first HWA, the first data being either data block or data line.

Example 17 includes the method of example 11, wherein the second data is consumed by the second HWA in response to initiation of a task by the second HWA, the second data being either data line or data block.

Example 18 includes the method of example 11, wherein the data swap-out instruction is sent in response to a set of first data aggregated in the memory.

Example 19 includes the method of example 11, wherein the data swap-in instruction is sent in response to a set of second data aggregated in the memory.

Example 20 includes the method of example 11, wherein the data swap-out instruction and the data swap-in instruction is based on a set of pattern adapters.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A circuit device comprising:
    a first hardware accelerator circuit configured to:
        perform a first operation on a first set of data;
        store the first set of data in a first memory;
        perform the first operation on a second set of data; and
        store the second set of data in the first memory;
    a memory controller configured to:
        cause the first set of data and the second set of data to be provided from the first memory to a second memory; and
        cause a subset of the first set of data and the second set of data to be provided from the second memory to the first memory;
    a second hardware accelerator circuit configured to perform a second operation on the subset of the first set of data and the second set of data; and
    a scheduler circuit coupled to the first hardware accelerator circuit, the second hardware accelerator circuit, and the memory controller, wherein the scheduler circuit includes:
        a first scheduler coupled to the first hardware accelerator circuit;
        a second scheduler coupled to the memory controller and configured to cause the memory controller to cause the first set of data and the second set of data to be provided from the first memory to the second memory; and
        a third scheduler coupled to the second hardware accelerator circuit and configured to cause the second hardware accelerator circuit to perform the second operation on the subset of the first set of data and the second set of data, wherein the scheduler circuit is configured to selectively couple the second scheduler between the first scheduler and the third scheduler.

2. The circuit device of claim 1, wherein:
    the scheduler circuit includes a fourth scheduler coupled to the memory controller and configured to cause the memory controller to cause the subset of the first set of data and the second set of data to be provided from the second memory to the first memory; and
    the scheduler circuit is configured to selectively couple the fourth scheduler between the second scheduler and the third scheduler.

3. The circuit device of claim 1, wherein the memory controller is a direct memory access (DMA) controller.

4. The circuit device of claim 1, wherein the first operation and the second operation are image processing operations.

5. The circuit device of claim 1, wherein the first operation and the second operation are machine learning operations.

6. A circuit device comprising:
    a first processor circuit configured to perform a first operation on a set of data;
    a second processor circuit configured to perform a second operation on the set of data;
    a memory controller configured to cause the set of data to be transferred between a first memory and a second memory; and
    a scheduler circuit that includes:
        a first scheduler coupled to the first processor circuit and that includes a set of producer sockets;
        a second scheduler coupled to the second processor circuit and that includes a set of consumer sockets;
        a third scheduler coupled to the memory controller and that includes a set of consumer sockets and a set of producer sockets; and
        a crossbar configured to selectably couple the third scheduler between the first scheduler and the second scheduler such that set of producer sockets of the first scheduler are coupled to the set of consumer sockets of the third scheduler.

7. The circuit device of claim 6 wherein:
    the first scheduler is configured to cause the first processor circuit to perform the first operation on the set of data and to store the set of data to the first memory;
    the third scheduler is configured to cause the memory controller to cause the set of data to be transferred from the first memory to the second memory; and
    the second scheduler is configured to cause the second processor circuit to read the set of data from the first memory and to perform the second operation on the set of data.

8. The circuit device of claim 6, wherein:
    the scheduler circuit includes a fourth scheduler coupled to the memory controller and that includes a set of consumer sockets and a set of producer sockets; and
    the crossbar is configured to selectably couple the fourth scheduler between the third scheduler and the second scheduler such that the set of producer sockets of the third scheduler are coupled to the set of consumer sockets of the fourth scheduler and the set of producer sockets of the fourth scheduler are coupled to the set of consumer sockets of the second scheduler.

9. The circuit device of claim 8, wherein:
    the first scheduler is configured to cause the first processor circuit to perform the first operation on the set of data and to store the set of data to the first memory;
    the third scheduler is configured to cause the memory controller to cause the set of data to be transferred from the first memory to the second memory;
    the fourth scheduler is configured to cause the memory controller to cause the set of data to be transferred from the second memory to the first memory; and
    the second scheduler is configured to cause the second processor circuit to read the set of data from the first memory and to perform the second operation on the set of data.

10. The circuit device of claim 6, wherein the first operation and the second operation are image processing operations.

11. The circuit device of claim 6, wherein the first operation and the second operation are machine learning operations.

12. A method comprising:
    causing, using a first scheduler, a first hardware accelerator circuit to:
        perform a first operation on a first set of data;
        store the first set of data in a first memory;
        perform the first operation on a second set of data; and
        store the second set of data in the first memory;

causing, using a second scheduler, based on the first scheduler, a memory controller to cause the first set of data and the second set of data to be provided from the first memory to a second memory; and causing, using a third scheduler, based on the second scheduler, a second hardware accelerator circuit to:
  read a subset of the first set of data and the second set of data from the first memory; and
  perform a second operation on the subset of the first set of data and the second set of data, wherein the first set of data and the second set of data are provided from the first memory to the second memory before the second operation is performed on the subset of the first set of data and the second set of data.

13. The method of claim 12 further comprising:
causing, using a fourth scheduler, based on the third scheduler, the memory controller to cause the subset of the first set of data and the second set of data to be provided from the second memory to the first memory.

14. The method of claim 12, wherein the first operation and the second operation are image processing operations.

15. The method of claim 12, wherein the first operation and the second operation are machine learning operations.

* * * * *